Nov. 15, 1932.   P. SPORN ET AL   1,887,962
TESTING ARRANGEMENT FOR POWER CIRCUITS
Original Filed Sept. 17, 1924   2 Sheets-Sheet 1

Inventors
PHILIP SPORN
HENRY D. FREITAG
By their Attorneys
Cromwell, Greist & Warden

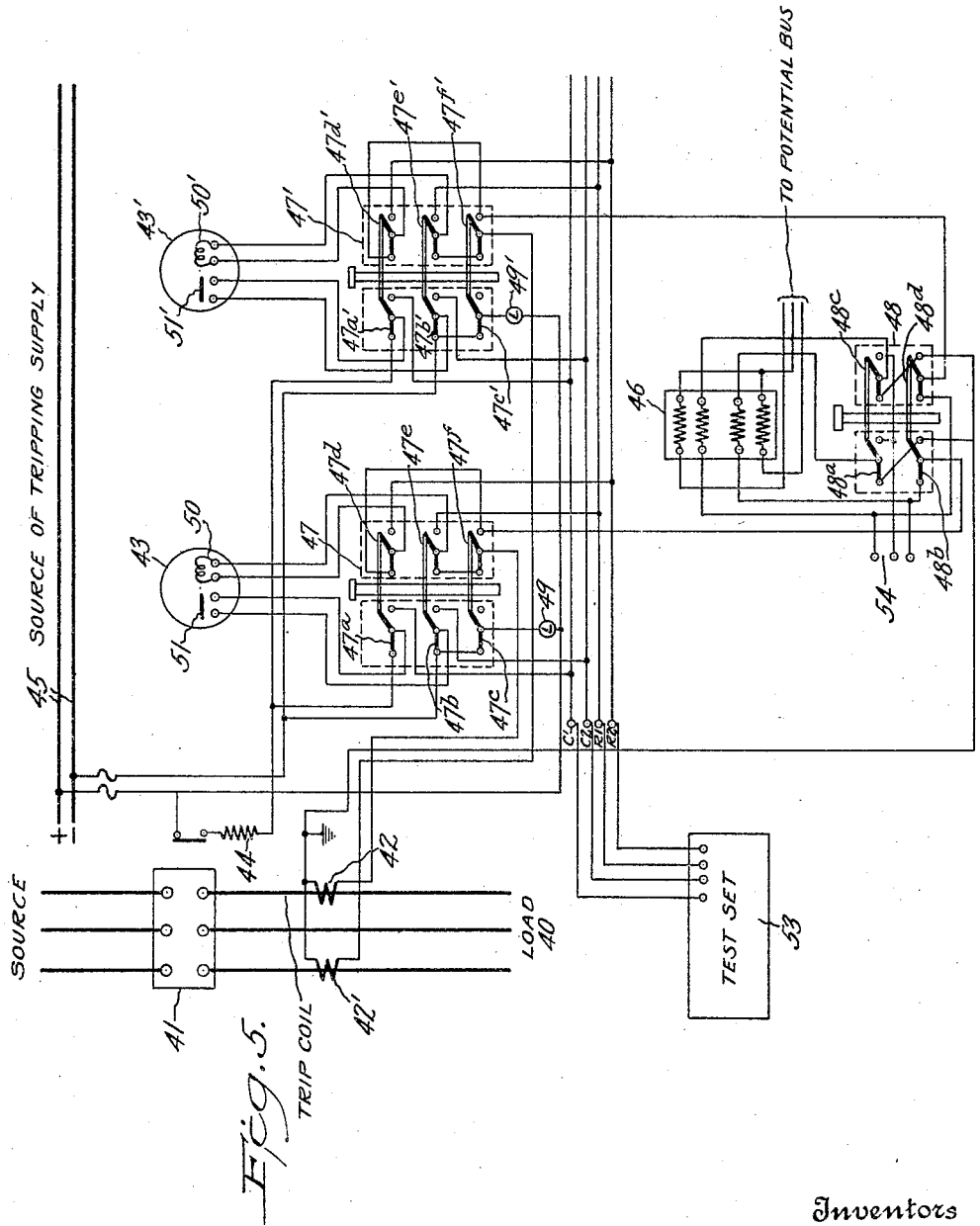

Patented Nov. 15, 1932

1,887,962

UNITED STATES PATENT OFFICE

PHILIP SPORN, OF BROOKLYN, AND HENRY D. FREITAG, OF LYNBROOK, NEW YORK, ASSIGNORS TO ELECTRIC PROGRESS COMPANY, INC., OF NEW YORK, N. Y., A CORPORATION OF NEW YORK

TESTING ARRANGEMENT FOR POWER CIRCUITS

Original application filed September 17, 1924, Serial No. 738,272. Divided and this application filed December 5, 1930. Serial No. 500,180.

This is a division of our co-pending application Serial Number 738,272, filed September 17, 1924. The object of the invention is to provide an arrangement for testing relays, meters or similar apparatus associated with the power circuits of power transmission and distribution systems without disturbing the operating circuits of the system and with a minimum impairment of the safety and simplicity of the system.

According to the invention a relay or meter calibrating switch is provided by means of which the contact circuits and operating coil circuits of the relay or meters are separated from the normal power circuits connected to these contacts or operating coils and are thrown over to testing busses by means of which any predetermined current or voltage may be applied to the operating coils, and the operation or registration of the relays or meters observed. By the arrangement of the invention, the load adjustment and testing of a relay can be made while the relay is in operating position, the relay being thrown into the testing position only after the testing apparatus is set, thus cutting down to a minimum the loss of the protective value of the relays. The arrangement has also combined therewith a lamp for indicating the condition of the relay circuits and means for assuring that the relay is normally left in the operating position.

The original application is directed to, and claims, the special test switch used in the test arrangement of our invention described hereinafter. The present application is directed to the general arrangement for the improved and simplified testing of relays or meters and is not limited to any particular type of switch.

The objects of the invention will be best understood from the following description of an exemplification thereof, reference being had to the accompanying drawings wherein Fig. 1 is an end section view of a testing switch used in the arrangement of the invention;

Fig. 5 is a circuit diagram of an improved testing arrangement according to the invention.

Figure 1:
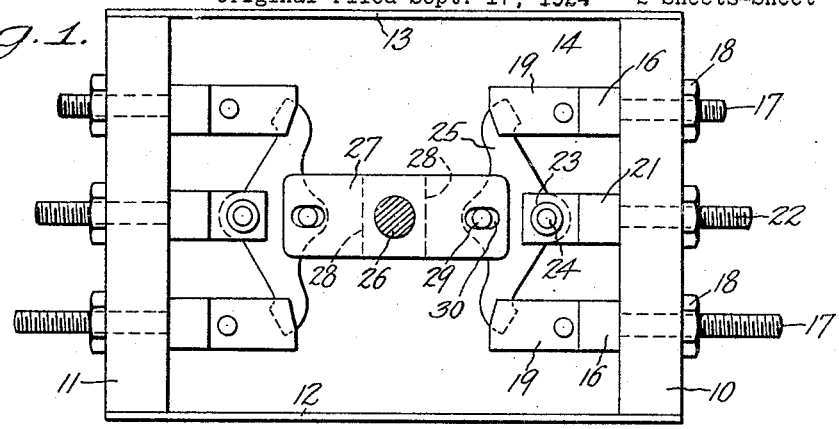
Figure 2:
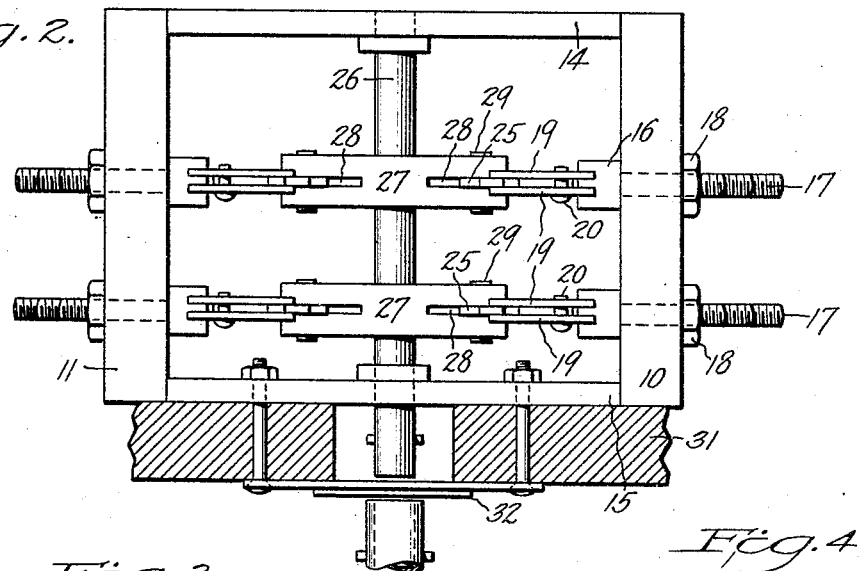
Fig. 2 is a top plan view of a switch with the cover removed.
Figure 3:
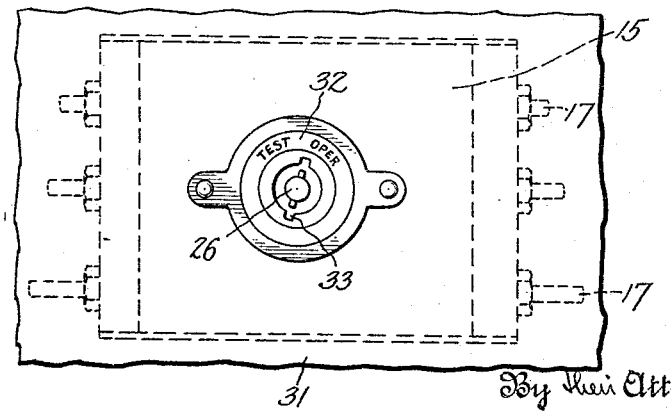
Fig. 3 is a front elevational view of the switch installed in a panel.
Figure 4:
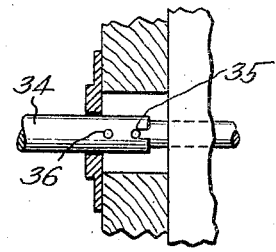
Fig. 4 is a view showing the mounting of the key for operating the switch shaft.

The testing switch used in the arrangement of the invention as shown in Figs. 1 to 4 comprises a box-like container having side walls 10, 11 and panel members 14, 15, a bottom wall 12, and a cover wall 13. On the opposite walls 10, 11 are mounted sets of rectangular lugs 16 secured in the walls by means of threaded studs 17. The lugs 16 carry pairs of contact fingers 19 which are spaced from each other, the spacing being adjustably fixed by screws 20. Between each set of lugs 16 are mounted additional central lugs 21 secured to the walls 10, 11 by means of threaded studs 22. The central lugs 21 carry pairs of ears 23 supporting pivot pins 24 on which are pivotally mounted contact blades 25 for movement to establish electrical connection between the central lug members 21 and with the contact fingers lying on either one or the other side of the central lug members. The contact blades 25 are so shaped and arranged that in their intermediate position they engage the contact fingers lying on both sides of the central lug members, as shown in Fig. 1. The several blades cooperating with the contact members mounted on the opposite walls 10, 11 are pivoted to one or another position by means of a shaft 26 extending longitudinally through the box between the walls 10, 11. The shaft carries blocks 27 provided with transverse slots 28 adapted to fit over the contact blades 25. Pins 29 mounted in the blocks transversely to the slots 28 and engaging slots 30 formed in the central part of the blades 25, transmit the movement of the blocks to the blades so that upon turning the shaft 26 one way or the other, the blades 25 are pivoted from one contact position to the other.

The box-like structure containing the switch mechanism is mounted on the back of a panel board 31 which is provided with an orifice in which the extending end of the shaft 26 is housed, the projecting length of the shaft being less than the thickness of the panel 31. The hole in the panel is covered by an escutcheon plate 32 having an opening provided with a pair of diametrically opposed slots 33. A suitable key 34 is adapted to be inserted through the opening in the escutcheon plate, the key having a bore fitting the end of the shaft 26 and having slots adapted to engage pins 35 mounted on the shaft, so that upon rotating the key the shaft is rotated. The key is likewise provided with registering pins 36 arranged to fit the slots 33 in the escutcheon plate, so that the key may be inserted and taken out from the escutcheon plate opening only in the position where the registering pins 36 register with the slots 33. The position of the slots in the escutcheon plate 33 is so chosen that when the key is in the position in which it can be taken out from the escutcheon plate, the shaft 26 of the switch is turned to a position where the blades establish the connections for the normal operation of the apparatus in the station, this position being indicated on the escutcheon plate by the letters "OPER" or other suitable designation. After the key is inserted, it may be turned to bring the contact blades to the opposite switching position, the switch being then in the testing position corresponding to the designation on the escutcheon plate indicated by the word "TEST".

The only portion of the switch mechanism exposed to view when the apparatus is mounted in position is the face of the escutcheon plate 32 upon which the designations "TEST" and "OPER" appear. When the key is inserted into place the switch contacts are in the position in which the normal operating circuits are established. In order to establish the testing circuits, the key is turned to the position indicated by the word "TEST". This rotates the shaft 26 with the blocks 27 and causes the contact blades 25 to engage the contact fingers opposite those with which they are in engagement in the operating position.

The testing of the relays is accomplished by sending current through the operating coils of the relays and timing or testing the relay operation.

A typical testing arrangement illustrating the testing switch shown in Figs. 1 to 4 as used in accordance with our invention is shown in Fig. 5. The arrangement comprises a three-phase high voltage feeder 40 provided with an oil circuit breaker 41, series current transformers 42, 42', protective relays 43, 43', a circuit breaker tripping coil 44, a direct-current source for tripping current 45, a watthour meter 46, relay test switches 47, 47', and a meter test switch 48, each of the test switches being of the construction shown in Figs. 1 to 4. Lamps 49, 49' may be provided for indicating the condition of the relay circuits. The relays 43, 43' are provided with actuating coils 50, 50' and tripping contacts 51, 51', connected to energize the tripping coil 44 and trip the circuit breaker in case the relay is actuated by an overload through the associated current transformer 42, 42'. The watthour meter measures the amount of power flowing through the feeder.

With the arrangement shown in Fig. 5, if it is desired to test relay 43, a testing apparatus 53 is connected to its busses $C_1$, $C_2$, $R_1$, $R_2$, and the circuits of the testing apparatus are adjusted to be ready for the test, while the test switch is left in its normal operating position shown in the drawings. When all adjustments have been made ready, the test switch is thrown to the "TEST" position and the relay tested in a short time, whereupon the test switch is immediately thrown back into the operating position. While thus testing relay 43, the circuits of relay 43' and of the watthour meter 46 are left undisturbed and will continue to operate. Similarly, relay 43' or watthour meter 46 can each be tested without disturbing the other meters and relays and the associated current transformer circuits.

As seen in Fig. 5, the test switches 47, 47', and 48 are all shown in the normal operating positions. The testing switches 47 and 47' have each six simultaneously actuated double-pole switch units 47a to 47f and 47'a to 47'f, respectively, and test switch 48 has four simultaneously actuated double-pole switch units 48a to 48d.

In the position shown in the drawings, the various switch units of switches 47 and 48 establish connections as follows: Switch units 47a and 47b connect the tripping contacts 51 of relay 43 to the energizing circuit of tripping coil 44 so that on closure of the tripping contacts 51 the circuit breaker 41 is tripped. Switch 47c establishes an energizing circuit from the source 45 for lamp 49 so as to maintain it illuminated as long as switch 47 is in operating position, the circuit being opening at unit 47c when the switch 47 is thrown into the opposite testing position. Switch units 47d, 47e and 47f connect the two terminals of the relay tripping coil 50 into a closed circuit leading from the current transformer winding 42, the closed circuit also including one of the current coils of the watthour meter 46 to which connection is made through switch units 48a and 48b of the meter testing switch 48.

The switch units 47'a to 47'f of switch 47' and switch units 48c and 48d provide corresponding connections between the tripping contacts 51', circuit breaker tripping coil 44, lamp 49', current transformer 42', relay actuating coil 50′ and the second current coil of the watthour meter 46.

When the testing switch 47 for testing relay 43, for instance, is thrown to the opposite testing position, the various switch units 47a to 47f establish in the new positions the following connections: The switch units 47a and 47b disconnect the tripping contacts 51 of relay 50 from the energizing circuit of circuit breaker tripping coil 44 and connect the tripping contacts 51 to the test busses $C_1, C_2$ leading to the test set 53. The switch units 47d and 47e disconnect the relay actuating coil 50 from the closed circuit of the current transformer 42 and connect the relay coil 50 to the test busses $R_1, R_2$ leading to the test set 53. Simultaneously, switch unit 47f completes the closed circuit for the current transformer over the current coil of the watthour meter 46, bridging the now open connections over switch units 47d and 47e that formerly included relay coil 50 in the closed circuit. In going from operating to testing positions, there is at all times maintained a complete closed circuit around the current transformer coil 42, because through the special construction of the testing switches shown in Figs. 1 to 4, the switch units when in intermediate position have the blades in engagement with all of the cooperating contact fingers, so that the new closed circuits are established at the contact fingers that come into engagement with the blades before circuits are broken at the contact fingers that become disengaged from the contact blades.

Thus, with the testing switch 47 in testing position, the watthour meter 46 is energized as in normal operation, and the current transformer 42 is closed-circuited, but the actuating coil 50 and the tripping contacts 51 of the relay are disconnected from their normal operating circuits and are connected to the testing set 53 by means of which the action of the relay may now be conveniently checked and tested without disturbing the operating circuits and apparatus at the station. After the test is through, the throwing of the testing switch 47 to operating position restores the normal operating connections of the relay 43, again without disturbing the closed circuit of the current transformer 42 and the energization of the watthour meter 46.

In a similar way relay 43′ that is operated by current transformer 42′ of the other feeder phase may be tested by means of testing switch 47′ without disturbing the closed circuit of the current transformer and the energization of the watthour meter 46.

If the watthour meter 46 is to be tested and the meter testing switch 48 is thrown from the normal operating position shown in the drawings to the opposite testing position, the various switch units 48a to 48d establish the following connections: Switch units 48b and 48d bridge the connections leading from the closed circuits of the two current transformers 42 and 42′ to the two current coils of the watthour meter 46, respectively, and simultaneously disconnect one terminal of the two current coils of the watthour meter 46 from the two transformer circuits, respectively. Switch units 48a and 48c disconnect the other terminals of the two current coils of the watthour meter 46 from the transformer circuit and connect said coil terminals to a common bus leading to one of three meter testing terminals 54, the other two meter testing terminals being permanently connected to the leads from the switch units 48a and 48d to the watthour meter current coil terminals. A standard testing meter may be connected to the meter testing terminals 54 and the meter tested while the testing switch 48 is in testing position.

After completion of the test the watthour meter 46 may be again quickly connected in its normal operating circuits by throwing the testing switch 48 to the operating position. Because of the special construction of the switch units and the intermediate bridging of the switch contacts, the transitions between the operating and testing position are effected without disturbing the closed circuits of the current transformer 42, 42′ and the operating circuits of the relays 43, 43′, or any other parts of the operating system.

The invention may be embodied in the form of many other arrangements that will suggest themselves to those skilled in the art and it is accordingly desired that the appended claims be given a broad construction commensurate with the scope of the invention within the art.

We claim:

1. In a testing arrangement for power station apparatus, an alternating-current power line, a current transformer energized by said line, an auxiliary apparatus associated with said power line adapted to be connected in a closed circuit with said current transformer to be energized thereby, a testing device for said auxiliary apparatus, and switch means for completely disconnecting the leads of said auxiliary apparatus from its normal operating circuits and said current transformer and connecting said auxiliary apparatus to said testing apparatus, said switch means being so arranged that on being actuated from operating to testing position a new closed circuit for said current transformer is completed bridging the connections leading to said auxiliary apparatus prior to opening of said last-named connections, and on being actuated back to normal operating position said switch means restoring the normal closed circuit of said current transformer through said auxiliary apparatus before opening said bridging closed circuit.

2. In a testing arrangement for power station apparatus, an alternating-current power line, a current transformer energized by said line, a plurality of auxiliary apparatus associated with said line, each of said auxiliary apparatus having a current element adapted to be connected in series with each other to form a closed circuit with said current transformer to be energized thereby, a testing device for one of said auxiliary apparatus, and switch means for disconnecting said auxiliary apparatus from its normal operating circuits and said current transformer and connecting said auxiliary apparatus to said testing apparatus, said switch means being so arranged that on being actuated from operating to testing position the connections to the current element of the auxiliary apparatus to be tested are bridged and a closed circuit for the current transformer and the current element of the other auxiliary apparatus is completed prior to opening of the closed circuit connection to the current element of the apparatus to be tested, and on being actuated from testing position to operating position said switch means restore the normal closed circuit connections of said transformer prior to opening of said bridging closed circuit.

3. In a testing arrangement for power station apparatus, a three-phase alternating-current power line, a circuit breaker for said power line, a pair of current transformers associated with two phases of said power line, a tripping circuit for said circuit breaker, a tripping relay having a coil connected in a closed circuit with one of said current transformers for actuating said tripping circuit, a second tripping relay having a current coil connected in a closed circuit connected with the other of said current transformers for actuating said tripping circuit, a testing device for testing either one or the other of said relays, and testing switch means for each of said relays for disconnecting the associated relay from its normal operating circuits and connecting the relay to said testing apparatus for testing the same independently of the power circuit, said testing switch means being so arranged that on being actuated from operating to testing position a new closed circuit for said current transformer is completed bridging the connections leading to the current coil of the associated relay prior to the opening of said connection, and on being actuated from testing position to operating position said switch means complete the normal closed circuit between the current coil and the associated current transformer prior to opening of the bridging circuit.

4. In a testing arrangement for power station apparatus, an alternating-current power line, a current transformer energized by said line, a relay associated with said power line and having a current coil adapted to be connected in a closed circuit with said current transformer to be energized thereby, a meter device having a current element adapted to be connected in series with said current coil in the closed circuit of said current transformer to energize said meter device, a testing device for said relay, and switch means for disconnecting said relay from its normal operating circuits and connecting the same to said testing apparatus, said switch means being so arranged that on being actuated from operating to testing position a new closed circuit for said current transformer and said current element of the meter device is completed bridging the connections leading to said current coil prior to the opening of said connections, and on being actuated from the testing position to the operating position said switch means restore the normal closed circuit including serially said current coil, said current element and said current transformer prior to the opening of said bridging circuit.

5. In a testing arrangement for power station apparatus, a three-phase alternating-current power line, a pair of current transformers associated with two phases of said power line, a pair of relay devices having each a current coil, a meter device having a pair of current elements, the current coil of one relay device and the current element of the meter device being connected in a closed circuit with one current transformer, and the other current element of said meter and the current coil of the other relay being connected in a closed circuit with the other current transformer, a testing device for said relay devices, and switch means for each relay device for disconnecting said relay device from its normal operating circuits and connecting it to said testing apparatus, said switch means being so arranged that on being actuated from operating to testing position a closed circuit for said current transformer and the associated current element of the meter is completed bridging the connections leading to the current coil of the associated relay prior to the opening of the connections to said current coil, and on being actuated from testing position to operating position said switch means restore the normal closed circuit of the associated current transformer prior to the opening of said bridging connections.

In testimony whereof, we have hereunto subscribed our names, this 4th day of December, 1930.

PHILIP SPORN.
HENRY D. FREITAG.